United States Patent [19]

Wisotsky et al.

[11] 4,087,255

[45] May 2, 1978

[54] COPOLYMERS OF ETHYLENE AND ETHYLENICALLY UNSATURATED MONOMERS, PROCESS FOR THEIR PREPARATION AND DISTILLATE OIL CONTAINING SAID COPOLYMERS

[75] Inventors: Max J. Wisotsky, Highland Park; Norman Tunkel, Perth Amboy, both of N.J.

[73] Assignee: Exxon Research & Engineering Co., Linden, N.J.

[21] Appl. No.: 432,947

[22] Filed: Jan. 14, 1974

Related U.S. Application Data

[60] Continuation of Ser. No. 158,632, Jun. 30, 1971, abandoned, which is a division of Ser. No. 808,040, Mar. 12, 1969, abandoned, which is a continuation-in-part of Ser. No. 717,902, Apr. 1, 1968, abandoned.

[51] Int. Cl.² .............................................. C10L 1/18
[52] U.S. Cl. .......................................... 44/62; 44/70
[58] Field of Search ..................... 44/62, 70; 260/87.3

[56] References Cited

U.S. PATENT DOCUMENTS

| | | | |
|---|---|---|---|
| 3,449,251 | 6/1969 | Tunkel et al. | 44/62 |
| 3,627,838 | 12/1971 | Ilnyckyj | 260/87.3 |
| 3,642,459 | 2/1972 | Ilnyckyj | 44/62 |

OTHER PUBLICATIONS

Renfrew, Polythene (1957) pp. 38–39.

*Primary Examiner*—Daniel E. Wyman
*Assistant Examiner*—Mrs. Y. Harris-Smith
*Attorney, Agent, or Firm*—Frank T. Johmann

[57] ABSTRACT

Polymers of 1,000 to 50,000 and preferably of 1,000 to 2,900 number average molecular weight, comprising 3 to 40 molar proportions of ethylene per molar proportion of an ethylenically unsaturated monomer, are prepared by free radical catalysis in a solvent at temperatures of less than 130° C. in order to minimize ethylene branching, for use as wax crystal modifying agents, e.g. pour depressants and flow improvers for distillate mineral oil, e.g. middle distillate fuel oil.

8 Claims, No Drawings

COPOLYMERS OF ETHYLENE AND ETHYLENICALLY UNSATURATED MONOMERS, PROCESS FOR THEIR PREPARATION AND DISTILLATE OIL CONTAINING SAID COPOLYMERS

This is a continuation of application Ser. No. 158,632 filed Jun. 30, 1971, which is a division of Ser. No. 808,040 filed Mar. 12, 1969, which is a continuation-in-part of Ser. No. 717,902 filed Apr. 1, 1968, all now abandoned.

BACKGROUND OF THE INVENTION

1. Field of the Invention

The present invention relates to ethylene backbone copolymers, distillate oil compositions containing the copolymers, and an improved method of preparing the copolymers for use as pour depressants and flow improvers for distillate oil, which method reduces ethylene branching and involves free radical polymerization in a solvent, at temperatures below 130° C. These copolymers comprise about 3 to 40 molar proportions of ethylene monomer per about one molar proportion of an unsaturated monomer other than ethylene, having number average molecular weights in the range of about 1,000 to 50,000 and preferably in the range of 1,000 to 2,900.

2. Description of the Prior Art

The commercially most important ethylene-containing pour depressant and flow improvers for distillate oil are copolymers of ethylene and ethylenically unsaturated ester monomers, such as the copolymers of ethylene and vinyl alcohol esters, particularly vinyl acetate, which copolymers are well known in the prior art. For example, U.S. Pat. No. 3,048,479 teaches copolymers of ethylene and $C_3$ to $C_5$ vinyl esters, e.g. vinyl acetate, having molecular weights of about 1,000 to 3,000 according to K. Rast's method of determining mol. wt. (Ber. 55, 1051, 3727 (1922)), as pour depressants for fuels, specifically heating oils, diesel and jet fuels. The copolymers of the examples of said patent were prepared by free radical catalysis, using ditertiary butyl peroxide as the catalyst, (although the patent teaches any peroxide catalyst), at temperatures of 280° to 340° F., in a solvent. U.S. Pat. No. 3,087,894 teaches a low cold test fogging oil containing as a pour depressant an ethylene-vinyl acetate copolymer essentially of the same type described in said U.S. Pat. No. 3,048,479. U.S. Pat. No. 3,131,168 teaches a free radical process for making ethylene-vinyl acetate copolymers as pour depressants for middle distillate using temperatures up to 440° F., a solvent such as toluene or hexane, any peroxy compound or catalyst, but preferably ditertiary butyl peroxide, and adding additional ethylene to the reaction during the polymerization. U.S. Pat. No. 3,093,623 teaches still another method for making these ethylene-vinyl acetate pour depressants for middle distillates by continuously adding vinyl acetate and ethylene during the course of the reaction. In addition, U.S. Pat. No. 3,250,714 teaches ethylene-vinyl acetate copolymers having molecular weights of 3500 to 7000 as V.I. improvers for lubricating oils. However, all the aforesaid prior art patents are directed to carrying out the free radical polymerization at relatively high temperatures, i.e. in excess of 130° C.

Now, generally speaking, the free radical polymerization temperature is related to: the decomposition temperature of the catalyst, i.e. the temperature has to be such to decompose the catalyst; the half life of the catalyst, i.e. the temperature cannot be so high that the catalyst decomposes so fast that it is used up before the reaction is completed; and the yield of polymer per pound of catalyst, i.e. catalyst utilization. In the aforesaid prior patents on peroxide catalyzed ethylene-unsaturated monomer copolymers as pour depressants, relatively high temperatures were used for the polymerization and catalyst is added continuously during the reaction. Thus, in general, the higher the temperature, the greater the activity of the monomers, which in turn gives a faster reaction time and a greater yield of polymer per pound of catalyst so that the reaction is more efficient. As a result, the incentive has been to use the peroxide catalysts at high temperatures. The method of the present invention differs from the prior art in deliberately operating at polymerization temperatures below the optimum for monomer utilization, and preferably using free radical catalysts with low decomposition temperatures. By this low temperature technique, it was found that the amount of ethylene branching is considerably reduced and copolymers produced by this method were superior pour point depressant and flow improvers to prior art copolymers prepared at higher temperatures. Specifically, the prior ethylene-vinyl acetate pour point depressants, while very effective in treating distillate fuel oil to lower the pour point, frequently results in wax crystals having large particle sizes ranging from one millimeter up to an inch in their largest dimension, depending upon the exact nature of the distillate oil, e.g. crude source, narrowness of the boiling range, etc. While the treated distillate oil containing these large wax crystals exhibits a pour point significantly under the original pour point of the untreated oil, in many cases, the large wax crystals will tend to plug filter equipment and lines normally used on delivery trucks and fuel oil storage systems when the oil is cooled below its cloud point, even though above its pour point. Thus, as the oil containing the pour point depressant is cooled, the cloud point (the point at which the oil becomes cloudy due to crystallization of wax) will generally be reached at a temperature significantly above the pour point (the point at which the oil can no longer conveniently be poured). As a result, oils below their cloud point and above their pour point will be pourable, but at the same time the wax crystals that have formed, if too large, can result in plugging the aforesaid filter equipment. Copolymerizing ethylene and vinyl acetate at a low temperature by the process of the invention can give the very good pour point reduction of the prior art ethylene-vinyl acetate copolymers, and in addition form smaller wax crystals during cooling of the treated oil. As a result, copolymers prepared by the method of the present invention, can regulate the maximum size of the wax crystals that are formed, on cooling at rates normally encountered during cold weather, to a particle size in the order of about 0.1 millimeter or less. Because of this, even though the cloud point of the oil treated with copolymer prepared by this new method is substantially the same as the cloud point when the oil is treated with the copolymer prepared by the older prior art methods, an important improvement in filterability and flow is obtained in actual operating use with elimination of clogged filters. It is not known exactly why these improvements occur. Nuclear magnetic resonance studies indicate that at lower polymerization temperature, the number of ethylene side branches forming on the main polymer chain is reduced, for example to 6 or less methyl terminating side branches per 100 methylene groups. And, for some reason, not clearly known, this reduced branching in ethylene-unsaturated monomer backbone type pour depressants appears to result in a more effective pour depressing and flow improving ability.

SUMMARY OF THE INVENTION

The polymers of the invention will consist essentially of about 3 to 40, and preferably 3 to 20, molar proportions of ethylene per molar proportion of ethylenically unsaturated monomer, which latter monomer can be a single monomer or a mixture of such monomers in any proportion, said polymer being oil-soluble and having a number average molecular weight in the range of about 1,000 to 50,000, preferably about 1,000 to about 2,900, and most preferably about 1,500 to 2,500 as measured by Vapor Phase Osmometry, for example by using a Mechrolab Vapor Phase Osmometer Model 310A.

The unsaturated monomers, copolymerizable with ethylene, include unsaturated mono and diesters of the general formula:

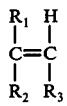

wherein $R_1$ is hydrogen or methyl; $R_2$ is a $-OOCR_4$ or $-COOR_4$ group wherein $R_4$ is hydrogen or a $C_1$ to $C_{16}$, preferably a $C_1$ to $C_4$, straight or branched chain alkyl group; and $R_3$ is hydrogen or $-COOR_4$. The monomer, when $R_1$ and $R_3$ are hydrogen and $R_2$ is $-OOCR_4$ includes vinyl alcohol esters of $C_2$ to $C_{17}$ monocarboxylic acids, preferably $C_2$ to $C_5$ monocarboxylic acids. Examples of such esters include vinyl acetate, vinyl isobutyrate, vinyl laurate, vinyl myristate, vinyl palmitate, etc. When $R_2$ is $-COOR_4$, such esters include methyl acrylate, methyl methacylate, lauryl acrylate, palmityl alcohol ester of alpha-methyl-acrylic acid, $C_{13}$ Oxo alcohol esters of methacrylic acid, etc. Examples of monomers where $R_1$ is hydrogen and $R_2$ and $R_3$ are $-COOR_4$ groups, include mono and di-esters of unsaturated dicarboxylic acids such as: mono $C_{13}$ Oxo fumarate, di-$C_{13}$ Oxo fumarate, di-isopropyl maleate; di-lauryl fumarate; ethyl methyl fumarate; etc.

As previously mentioned, about 3 to 40 moles of ethylene will be used per mole of other monomer, which other monmer is preferably an ester as hereinbefore defined, or a mixture of about 30 to 99 mole % ester and 70 to 1 mole % of a $C_3$ to $C_{16}$, preferably $C_4$ to $C_{14}$, branched or straight chain alpha monoolefin. Examples of such olefins include propylene, n-octene-1, n-decene-1, etc.

In general, the polymerizations can be carried out as follows: Solvent and a portion of the unsaturated ester, e.g., 0-50, preferably 10 to 30 wt. %, of the total amount of unsaturated ester used in the batch, are charged to a stainless steel pressure vessel which is equipped with a stirrer. The temperature of the pressure vessel is then brought to the desired reaction temperature and pressured to the desired pressure with ethylene. Then catalyst, preferably dissolved in solvent so that it can be pumped, and additional amounts of unsaturated ester are added to the vessel continuously, or at least periodically, during the reaction time, which continuous addition gives a more homogeneous copolymer product as compared to adding all the unsaturated ester at the beginning of the reaction. Also during this reaction time, as ethylene is consumed in the polymerization reaction, additional ethylene is supplied through a pressure controlling regulator so as to maintain the desired reaction pressure fairly constant at all times. Following the completion of the reaction, the liquid phase of the pressure vessel is distilled to remove the solvent and other volatile constituents of the reacted mixture, leaving the polymer as residue.

Usually, based upon 100 parts by weight of copolymer to be produced, then about 100 to 600 parts by weight of solvent, and about 1 to 20 parts by weight of catalyst, will be used.

The solvent can be any substantially non-reactive organic solvent for furnishing a liquid phase reaction which will not poison the catalyst or otherwise interfere with the reaction. Examples of solvents which may be used include $C_5$ to $C_{10}$ hydrocarbons, which can be aromatic such as benzene, toluene, etc.; aliphatic such as n-heptane, n-hexane, n-octane, isooctane, etc.; cycloaliphatic such as cyclohexane, cyclopentane, etc. Various polar solvents may also be used such as hydrocarbyl esters, ethers and ketones of 4 to 10 carbon atoms such as ethyl acetate, methyl butyrate, acetone, dioxane, etc. may also be used. While any of the preceding solvents, or mixtures thereof may be used, the aromatic solvents are, generally speaking, less preferred since they gave lower yields of polymer per amount of catalyst, i.e. the free radical promoter, than other solvents tested. A particularly preferred solvent is cyclohexane which is easily handled and which gave very good utilization of the promoter.

The temperature used during the reaction will be in the range of 70° to 130° C., preferably 80° to 125° C.

Preferred free radical catalysts are those which decompose rather rapidly at the prior noted reaction temperatures, for example those that have a half life of about an hour or less at 130° C. preferably. In general, this will include the acyl peroxides of $C_2$ to $C_{18}$, branched or unbranched, carboxylic acids such as diacetyl peroxide (half life of 1.1 hours at 85° C.); dipropionyl peroxide (half life of 0.7 hours at 85° C.); di-pelargonyl peroxide (half life of 0.25 hours at 80° C.); dilauroyl peroxide (half life of 0.1 hour at 100° C.), etc. The lower peroxides such as di-acetyl and di-propionyl peroxide are less preferred because they are shock sensitive, and as a result the higher peroxides such as di-lauroyl peroxide are especially preferred. The short half life catalysts of the invention also include various azo free radical initiators such as azodiisobutyronitrile (half life, 0.12 hours at 100° C.); azobis-2-methylheptonitrile and azobis-2-methyl-valeronitrile. In contrast to the preceding, di-tert. butyl peroxide which was used in many of the examples of several of the aforementioned patents of the prior art has a half life of about 180 hours at 100° C. and a half life of about 7 hours at 130° C. and is outside the scope of the present invention.

The pressures employed can range between 500 to 30,000 psig. However, relatively moderate pressures of 700 to about 3000 psig. will generally suffice with vinyl esters such as vinyl acetate. In the case of esters having a lower relative reactivity to ethylene, such as methyl methacrylate, then somewhat higher pressures, such as 3,000 to 10,000 psi. have been found to give more optimum results than lower pressures. In general, the pressure should be at least sufficient to maintain a liquid phase medium under the reaction conditions, and to maintain the desired concentration of ethylene in solution in the solvent.

The time of reaction will depend upon, and is interrelated to, the temperature of the reaction, the choice of catalyst, and the pressure employed. In general, however, ½ to 10, usually 2 to 5 hours will complete the desired reaction.

The polymers of the invention will generally be added to distillate hydrocarbon oils in amounts of 0.001 to 2 wt. %, generally 0.005 to about 0.5 wt. %, said wt. % being based upon the weight of the oil to be treated.

The distillate hydrocarbon oils, which are treated for pour depression with the polymers of this invention, include cracked and virgin distillate oils boiling in the range of 250° to 750° F., such as heating oil and diesel fuel oil. Also, the distillate oil can be a distillate lubricating oil. In addition, the polymers of the invention can be used as a dewaxing aid during dewaxing of light distillate lube oil stocks in the manner similar to that taught in U.S. Pat. No. 3,262,873.

The polymers of the invention may be used alone as the sole oil additive, or in combination with other oil additives such as other pour depressants or dewaxing aids; corrosion inhibitors; antioxidants; sludge inhibitors; etc.

The invention will be further understood by reference to the following examples which include preferred embodiments of the invention.

EXAMPLE I

A three liter stirred autoclave was charged with 1000 ml. of benzene as solvent and 50 ml. of vinyl acetate. The autoclave was then purged with nitrogen and then with ethylene. The autoclave was then heated to 105° C. while ethylene was pressured into the autoclave until the pressure was raised to 900 psig. Then, while maintaining a temperature of 105° C. and said 900 psig. pressure, 120 ml./hour of vinyl acetate and 100 ml./hour of solution consisting of 23 wt. % di-lauroyl peroxide dissolved in 77 wt. % of benzene, were continuously pumped into the autoclave at an even rate. A total of 290 ml. of vinyl acetate was injected over 2 hours and 25 minutes, while 250 ml. of the peroxide solution (or 59.3 gm. of peroxide) were injected into the reactor over a period of 2 hours and thirty five minutes from the start of the injection. After the last of said peroxide was injected, the batch was maintained at 105° C. for an additional 10 minutes. Then, the temperature of the reactor contents was lowered to about 60° C., the reactor was depressurized, and the contents were discharged from the autoclave. The empty reactor was rinsed with 1 liter of warm benzene (about 50° C.) which was added to the product. The product was then stripped of the solvent and unreacted monomers on a steam bath overnight by blowing nitrogen through the product. The final stipped product consisted of about 415 grams of copolymer of ethylene and vinyl acetate.

EXAMPLE II

The procedure of Example I was repeated but varying the feed rates and injection times.

EXAMPLE III

Following the general procedure of Example I, another copolymer was made, except that a reaction temperature of 82° C. and a pressure of 750 psig. was used. Also, the di-lauroyl peroxide catalyst was predissolved in benzene to form a pumpable solution consisting of 12 wt. % di-lauroyl peroxide in 88 wt. % benzene, and this solution was then pumped into the reactor. In addition, the feed rates and proportions were varied from those of Example I.

EXAMPLE IV

A series of 5 batches of polymer were prepared, each in exactly the same way, the products of which were combined to form one composite sample. These batches were carried out according to the general method of Example III except that different reaction temperature and pressure was used.

COMPARISON POLYMER A

A prior art ethylene-vinyl acetate copolymer was prepared according to the general method of Example I, but using di-t-butyl peroxide, a reaction temperature of 150° F., 950 psig. and minor other variations.

The conditions of preparation of the above examples, and the properties of the resulting ethylene-vinyl acetate copolymers are summarized in Table I which follows:

TABLE I

| | EXAMPLES | | | | |
|---|---|---|---|---|---|
| Polymer Preparation | I | II | III | IV | Comparison Polymer A |
| Peroxide Catalyst | Lauroyl | Lauroyl | Lauroyl | Lauroyl | t-Butyl |
| Reaction Temp., ° C. | 105 | 105 | 82 | 95 | 150 |
| Reaction Pressure, psig. | 900 | 900 | 750 | 800 | 950 |
| Initial Charges (ml) | | | | | |
| Benzene | 1000 | 1000 | 850 | 850 | 1150 |
| Vinyl Acetate | 50 | 50 | 40 | 40 | 40 |
| Injection Charges | | | | | |
| Vinyl Acetate (ml./hr.) | 120 | 100 | 100 | 100 | 90 |
| Injection Time for vinyl acetate, minutes | 145 | 150 | 150 | 150 | 135 |
| Ml./hr. Catalyst (% in Benzene) | 100(23%) | 100(23%) | 160(12%) | 160(12%) | 30(23%) |
| Injection Time for catalyst, minutes | 155 | 165 | 165 | 165 | 150 |
| Soak Time, minutes | 10 | 15 | 15 | 15 | 15 |
| Total Reaction Time, minutes | 165 | 180 | 180 | 180 | 165 |
| Polymer Properties | | | | | |
| Yield, g. | 415 | 415 | 322 | 370 | 550 |
| % Yield based on Comparison A | 75 | 75 | 59 | 67 | 100 |
| % Vinyl Acetate (By Sap. No.) | 37.5 | 33.2 | 42.4 | 35.3 | 32 |
| Mol Ratio, ethylene/vinyl acetate | 5.1 | 6.17 | 4.17 | 5.62 | 6.52 |
| Molecular Weight (VPO*) | — | — | 1740 | 1720 | 2000 |
| Kin. Visc., cs. (47% in kerosene) at 100° F. | 265 | 250 | — | 127 | 150 |

*VPO - Vapor phase osmometry.

The polymers of Table I were tested for pour point depression effectiveness using 0.025 wt. % of each polymer in a series of three different distillate heating oils defined as Fuel Oils A, B, and C which were respectively derived from a Middle East crude which gave a straight run distillate having a boiling range of 324° to 700° F., a Libyan crude, and a 50/50 blend of Libyan and Middle East crude. These polymers were also tested for flow improving ability at temperatures below the cloud point in a "Cold Filter Plugging Point Test" which is described in detail in Journal of the Institute of Petroleum, Volume 52, Number 510, June 1966, pp. 173-185. In brief, the Cold Filter Plugging Point Test is carried out with a 45 ml. sample of the oil to be tested which is cooled in a bath maintained at about −30° F. Every two degrees drop in temperature, starting from 4° F. above the cloud point, the oil is tested with a test device consisting of a pipette to whose lower end is attached an inverted funnel. Stretched across the mouth of the funnel is a 350 mesh screen having an area of about 0.45 square inch. A vacuum of about 7 inches of water is applied to the upper end of the pipette by means of a vacuum line while the screen is immersed in the oil sample. Due to the vacuum, oil is drawn across the screen up into the pipette to a mark indicating 20 ml. of oil. The test is repeated with each two degrees drop in temperature until the vacuum fails to fill the pipette to the aforesaid mark due to clogging of the screen with wax crystals. The results of the test are reported as the "operability limit" or cold filter plugging point, which is the temperature at which the oil no longer flows.

The results obtained by the above tests, in terms of ° F., are summarized in Table II which follows:

TABLE II

| | | ASTM D-97 Pour Point, ° F., using .025 wt. % Copolymer | | | | |
|---|---|---|---|---|---|---|
| | Fuel Oil per se | Ex. I | Ex. II | Ex. III | Ex. IV | A |
| Fuel A | 20 | +5 | 0 | 5 | 0 | 5 |
| Fuel B | 5 | −10 | −15 | −20 | −5 | −10 |
| Fuel C | 0 | −15 | −10 | −10 | −15 | −15 |
| Avg. Improvement | | 15 | 17 | 17 | 15 | 15 |

| | | Operability Limit, Cold Filter Plugging Point, ° F., using .025 wt. % Copolymer | | | | |
|---|---|---|---|---|---|---|
| | Fuel Oil per se | Ex. I | Ex. II | Ex. III | Ex. IV | A |
| Fuel A | 24 | 12 | 10 | 10 | 10 | 22 |
| Fuel B | 16 | 6 | 8 | 2 | 8 | 12 |
| Fuel C | 14 | 6 | 0 | 4 | 4 | 10 |

The polymer of Example III was blended in a number of different distillate heating oils in different amounts and then compared with Polymer A in pour depression and in Cold Filter Plugging Point. The compositions tested, and the results obtained, are summarized in Table III which follows:

TABLE III

ASTM POUR AND COLD FILTER PLUGGING POINT, ° F.

| Fuel Oil | Pour Point Wt. % Polymer | Plugging Point Polymer | | | Cold Filter Polymer | | |
|---|---|---|---|---|---|---|---|
| | | Nil | A | Ex. III | Nil | A | Ex. III |
| Fuel D | | 0 | | | 10 | | |
| | 0.025 | | −20 | −15 | | 6 | −4 |
| | 0.05 | | −25 | −25 | | 2 | −12 |
| | 0.1 | | | −35 | | | −22 |
| Fuel E | | 10 | | | 12 | | |
| | 0.025 | | −15 | −5 | | 10 | 2 |
| | 0.05 | | −25 | −10 | | 10 | −4 |
| | 0.1 | | | −15 | | | −14 |
| Fuel F | | 0 | | | 6 | | |
| | 0.025 | | −25 | −15 | | 0 | −6 |
| | 0.05 | | −35 | −25 | | −8 | −12 |
| | 0.1 | | | −35 | | | −16 |
| Fuel G | | 5 | | | 6 | | |
| | 0.025 | | −15 | −5 | | 2 | −6 |
| | 0.05 | | −25 | −10 | | 2 | −12 |
| | 0.1 | | | −25 | | | −16 |
| Fuel H | | 10 | | | 10 | | |
| | 0.025 | | −25 | −20 | | 4 | −2 |
| | 0.05 | | −40 | −25 | | 4 | −8 |
| | 0.1 | | | −30 | | | −18 |
| Fuel I | | −5 | | | 6 | | |
| | 0.025 | | −25 | −15 | | 0 | −8 |
| | 0.05 | | −35 | −25 | | −6 | −10 |
| | 0.1 | | | −35 | | | −12 |
| Fuel J | | 15 | | | 20 | | |
| | 0.025 | | 0 | −10 | | 12 | 8 |
| | 0.05 | | −10 | −20 | | 8 | 8 |
| | 0.1 | | | −25 | | | 10 |

In analyzing the preceding data, Table II shows a very marked improvement in low temperature flowability as shown by the Cold Filter Plugging Point. In each case, the oils containing copolymers of the invention in Table II were able to pass through the fine 350 mesh screen at considerably lower temperatures than Polymer A, thereby demonstrating the finer wax particles that form when the oil is treated with the additives of the invention. Similar results are shown with the large number of fuel oils treated in Table III. In sum, the products of Examples I-IV consistently gave better low temperature flowability than the commercial product Polymer A and in many cases was even more effective in lowering the pour point. In addition, nuclear magnetic resonance studies showed that Polymer A has about 12 methyl groups per 100 methylene groups, while the copolymers typified by Examples I to IV have only about 3.5 methyls per 100 methylene groups. Allowing for the terminal methyl groups at the ends of the polymers, then the copolymers of the invention have about 2 methyl terminating side branches, while Polymer A has about 10-11 methyl terminating side branches. The aforesaid branching does not include the methyl groups on the vinyl acetate portion of the molecule, but rather only the branching coming off the polyethylene backbone.

EXAMPLES V TO VIII

A series of ethylene-vinyl acetate copolymers were prepared in a manner similar to that of Example I, but varying the reaction conditions and/or the catalyst. The resulting copolymers were then tested in the following distillate oils:

Oil 1 - A distillate mineral lubricating oil having a viscosity at 100° F. of 75 SUS. and a pour point of 10° F.

Oil 2 - (Diesel Fuel A). A middle distillate diesel fuel oil boiling in the range of 324° to 700° F. obtained from a middle East crude.

Oil 3 - A middle distillate heating oil boiling in the range of 364° to 644° F. and having a pour point of 20° F. obtained from a mixture of crudes.

The oil compositions containing the polymers were tested for ASTM pour depression, the Cold Filter Plugging Point test previously described, and also in a "Fluidity Test". The Fluidity Test involves placing a 40 milliliter sample of the oil to be tested into an hour glass shape device, having upper and lower sections connected by an opening between the two sections having a diameter of about 2.25 mm. The lower section is covered by a thin aluminum disc. The oil in the tester is soaked in a cold box maintained at the test temperature for 2 hours. The tester is inverted and allowed to settle for one minute. Then the aluminum disc is punctured so that the oil flows from the upper chamber through the aforesaid opening into the lower chamber. A pass is considered when 80% or more volume of the oil flows from the upper chamber to the lower chamber in a time of 3 minutes or less. This test is repeated until the test is failed. The lowest temperature at which a pass was obtained is known as the operability limit.

Table IV which follows summarizes the pertinent reaction conditions under which the copolymers were prepared. Table V summarizes the effectiveness of the copolymers in the aforesaid Oils 1 to 3.

TABLE IV

| Example | Reaction Conditions | | | Polymer Properties | |
|---|---|---|---|---|---|
| | Catalyst | Temp., °C. | Pressure psig | Wt. % Vinyl Acetate | Mol.Wt. |
| V | lauroyl peroxide | 110 | 1100 | 31.8 | 2060 |
| VI | t-butyl perbenzoate | 110 | 950 | 42.9 | 2865 |
| VII | azodiisobutyronitrile | 110 | 950 | 35.5 | 2457 |
| VIII | benzoyl peroxide | 105 | 1100 | 38.8 | 2305 |
| Comparison Copolymer A | t-butyl peroxide | 150 | 950 | 32 | 2000 |

As seen by Table IV, the copolymers of Examples V to VIII illustrate the use of different free radical catalysts using low temperature polymerization, while Table V shows their operability as pour depressants and flow improvers in various oils. Thus, as shown by Table V, the copolymer of Example V was effective in a concentration of 0.1% copolymer in reducing the pour point of a lubricating oil (Oil 1) from +10 with no additive present to −20° F. 0.05 wt. % of the copolymer of Example V reduced the pour of a diesel fuel from 20° F. to 10° F., and the Cold Filter Plugging Point from 22° F. to −2° F. In general, the inventive copolymers of Examples V to VIII were as good as, and generally were superior, to the comparison Copolymer A in pour point reduction. In regard to wax crystal size, as indicated by the Cold Filter Plugging Point and Fluidity Test, the copolymers of Examples V to VIII were superior to Comparison Copolymer A prepared at a higher copolymerization temperature.

EXAMPLES IX to XII

A series of copolymers containing three different monomers were made according to the general method of Example I by reacting ethylene with a mixture of the other two monomers which were fed into the reactor together during the course of the reaction. The specific copolymers and the reaction conditions are specified in the following Table VI.

TABLE V*

Performance of Copolymers of Table IV

| Example | Oil 1 - Lube Pour | Oil 2 - Diesel Fuel Pour | Oil 2 - Diesel Fuel Cold Filter Plugging Point | Oil 3 - Heating Oil Pour | Oil 3 - Heating Oil Fluidity Test |
|---|---|---|---|---|---|
| Base Oil per se | 10(0%) | 20(0%) | 22(0%) | 20(0%) | Fail 10 (0%) |
| V | −20(.1%) | 10(0.05%) | −2(0.05%) | — | — |
| VI | −10(.05%) | 0(.05%) | 10(.05%) | −45(.02%) | — |
| VII | −15(0.1%) | −5(.05%) | 6(.05%) | −50(.02%) | Pass 10 (.02%) |
| VIII | −15(0.1%) | −10(.05%) | 6(.05%) | −40(.02%) | Pass 10 (.02%) |
| Comparison Copolymer A | −10(0.1%) | 0 (.05%) | 20(.05%) | −40(.02%) | Fail 10 (.02%) |

*The data in the table is arranged so the first number represents either the Pour Point or Cold Filter Plugging Point or operability limit in ° F., and the following number inside the parentheses represents the weight % concentration of additive in the oil.

TABLE VI

Copolymers of Ethylene, Vinyl Acetate and a Third Monomer

| Polymer Preparation | EXAMPLES | | | | Comparison Copolymer A |
|---|---|---|---|---|---|
| | IX | X | XI | XII | |
| Peroxide Catalyst | Lauroyl | Lauroyl | Lauroyl | Lauroyl | t-Butyl |
| Reaction Temp., ° C. | 105 | 105 | 105 | 105 | 150 |
| Reaction Pressure, psig. | 900 | 900 | 900 | 500–900 | 950 |
| Third Monomer | Vinyl laurate | di-($C_{13}$ Oxo) fumarate | $C_{12}$-$C_{16}$ α-olefin | Ethyl Acrylate | — |
| Initial Charges (ml) | | | | | |
| Benzene | 670 | 670 | 670 | 670 | 770 |
| Vinyl Acetate | 32 | 32 | 32 | 32 | 27 |
| Injection Charges | | | | | |
| Monomer Mixture*, ml./hr. | 80 | 80 | 80 | 80 | 60*** |
| Injection Time for monomer mixture, minutes | 145 | 145 | 145 | 120 | 135 |
| Catalyst Solution,** ml./hr. | 64 | 64 | 64 | 64 | 20 |
| Injection Time for Catalyst, minutes | 155 | 155 | 155 | 120 | 150 |
| Soak Time, min. | 10 | 10 | 10 | 10 | 15 |
| Total Reaction Time, min. | 165 | 165 | 165 | 130 | 165 |
| Polymer Properties | | | | | |
| Yield, g. | 205 | 202 | 255 | 238 | 370 |
| % Yield based on Comparison A | 55 | 55 | 69 | — | 100 |
| Wt. % ester (By Sap. No.) | 33.4 | 41.9 | 34.1 | 35.7 | 32 |
| Kin. Visc., cs. (47% copolymer | | | | | |

TABLE VI-continued

| | Copolymers of Ethylene, Vinyl Acetate and a Third Monomer | | | | |
|---|---|---|---|---|---|
| | EXAMPLES | | | | |
| Polymer Preparation | IX | X | XI | XII | Comparison Copolymer A |
| in kerosene) at 100° F. | 269.9 | 272.9 | 135.8 | 172.3 | 150 |

*80 wt. % vinyl acetate/20 wt. % 3rd monomer.
**Catalyst solution consisted of 23 wt. % peroxide in 77 wt. % benzene.
***100% vinyl acetate The copolymers of Table VI were tested for Pour and Cold Filter Plugging in the previously described Fuel A. The results are summarized in Table VII. considered as being on a comparable basis. The exact reaction conditions and results obtained are summarized in Table VIII which follows:

TABLE VIII

| | Effects of Different Solvents During Ethylene-Vinyl Acetate Copolymerization | | | | | |
|---|---|---|---|---|---|---|
| | EXAMPLES | | | | | |
| Polymer Preparation | XIII | XIV | XV | XVI | XVII | XVIII |
| Peroxide Catalyst | Lauroyl | Lauroyl | Lauroyl | Lauroyl | Lauroyl | Lauroyl |
| Reaction Temp., ° C. | 105 | 105 | 105 | 105 | 105 | 105 |
| Pressure, psig. | 1000 | 1050 | 1100 | 1050 | 1100 | 1300 |
| Initial Charge | | | | | | |
| Solvent, 1000 ml. | benzene | n-heptane | n-hexane | cyclohexane | ethylacetate | dioxane |
| Vinyl Acetate, ml. | 100 | 100 | 75 | 100 | 100 | 100 |
| Injection Charges | | | | | | |
| Vinyl Acetate, ml. | 240 | 240 | 380 | 320 | 262 | 246 |
| Injection Time for vinyl acetate, minutes | 120 | 120 | 140 | 120 | 130 | 120 |
| Ml. catalyst solution (23% in benzene) | 265 | 265 | 265 | 265 | 243 | 230 |
| Injection time for catalyst, minutes | 155 | 155 | 155 | 155 | 155 | 135 |
| Soak time, minutes | 10 | 10 | 10 | 10 | 15 | 15 |
| Total Reaction time, minutes | 165 | 165 | 165 | 165 | 170 | 140 |
| Polymer Properties | | | | | | |
| Yield, g. of copolymer | 480 | 790 | 745 | 970 | 680 | 885 |
| Wt. % Vinyl Acetate (by Sap. No.) | 39 | 29 | 31 | 29 | 28 | 26 |
| Kin.Visc.,cs.,100° F. (45% in kerosene | 213 | 63 | 79 | 82 | — | — |
| Mol. Wt. (VPO) | 2200 | 1500 | 1860 | 1700 | 1950 | 1800 |

TABLE VII

| | ° F. ASTM Pour Point using .025 wt.% Polymer | | | | |
|---|---|---|---|---|---|
| Fuel | Fuel per se | Ex. IX | Ex. X | Ex. XI | Ex. XII | Comparison Copolymer A |
| A | 20 | 10 | 10 | 5 | 10 | 5 |
| | ° F. Cold Filter Plugging using .025 wt.% Polymer | | | | |
| Fuel | Fuel per se | Ex. IX | Ex. X | Ex. XI | Ex. XII | Comparison Copolymer A |
| A | 24 | 14 | 14 | 12 | 16 | 22 |

As seen by the data of Tables VI and VII the copolymers prepared by the method of the invention were generally comparable to Comparison Copolymer A in Pour Point. However, with regard to flowability as determined by the Cold Filter Plugging Point, the copolymers prepared by the inventive method were significantly better ranging from 12° to 16° F. as compared to 22° F. for Comparison Copolymer A. The molecular weight of Polymers IX to XII was not directly determined. However, the kinematic viscosity data of Table VI indicates that the number average molecular weight of all these examples was in the preferred range of the invention, i.e. 1,000 to 2,900, and thus were comparable to Comparison Copolymer A. Also, the $C_{12-16}$ α-olefin shown for Example XI in Table VI was a mixture of α-monoolefin running from 12 to 16 carbon atoms each.

EXAMPLES XIII to XVIII

A series of ethylene-vinyl acetate copolymers were prepared in the general manner of Example I, using di-lauroyl peroxide as the catalyst, i.e. free radical promoter, at substantially the same reaction conditions, except that different solvents were used. While there was some minor variation between the reaction conditions of these Examples, e.g. pressures of 1,000 to 1,300 psig., they were not significant, and all reactions can be As seen by Table VIII, a considerable variation in the number of grams of copolymer occurred, depending upon the specific solvent that was used. For practical purposes, the amount of benzene carried into the reactor with the catalyst solution can be disregarded since it was only a fraction of the total solvent present in the system. Furthermore, systems wherein the catalyst was dissolved in non-benzene solvents give substantially the same results shown above, e.g. a cyclohexane system in which the catalyst is also predissolved in cyclohexane rather than benzene. Thus, Example XIII was carried out using 1,000 ml. of benzene as solvent, adding 100 ml. vinyl acetate initially to the benzene, then adding 240 ml. more of vinyl acetate continuously over a 120 minute period and adding 265 ml. of a solution consisting of 23 wt. % di-lauryl peroxide in 77 wt. % benzene as solvent continuously over 155 minutes, while maintaining ethylene pressure of 1,000 psig. and a temperature of 105° C., followed by maintaining these reaction conditions during a 10 minute soak period. Since the half life of the lauroyl peroxide is only about 5 minutes under these conditions, then at the end of the soak period, reaction had substantially ceased. Example XII resulted in a yield of 480 grams of ethylene-vinyl acetate copolymer. Substituting n-heptane for benzene (Example XIV) gave a yield of 790 grams copolymer at an even lower vinyl acetate content in the copolymer then Example XIII, i.e. 29% versus 39%, thus indicating that even more vinyl acetate could have been added during the reaction. cyclohexane gave a yield of 970 grams of copolymer (Example XVI) and for this reason is a particularly preferred solvent.

A series of Cold Filter Plugging Point Tests (previously described) were made on the copolymers of Examples XIII to XVIII using three different distillate home heating oils identified as Fuels K, L and M. Fuel K consisted of 55 wt. % cracked stock and 45% virgin stock, and was derived from a mixture of Brega and Safania crudes. Fuels L and M were straight run distillate fuel oils derived from Mid-Continent crudes. The results obtained are summarized in Table IX which follows:

TABLE IX

Operability Limit, Cold Filter Plugging Point, ° F. Using .025 Wt. % Copolymer

| Fuel Oil | Fuel Oil per se | COPOLYMER OF EXAMPLE | | | | | |
|---|---|---|---|---|---|---|---|
| | | XII | XIV | XV | XVI | XVII | XVIII |
| Fuel K | 24 | 12 | 8 | 12 | 10 | 10 | 12 |
| Fuel L | 12 | −2 | −4 | −6 | −8 | −4 | 8 |
| Fuel M | 16 | 6 | 6 | 4 | 0 | 8 | 2 |

A series of Fluidity Tests were carried out on a No. 2 distillate home heating oil having a pour point of about 0° F., hereinafter identified as Fuel N. These Fluidity Tests were carried out in the manner similar to that previously described, except that the wt. % copolymer that was required to pass the Fluidity Test at −6° F. was determined. The results obtained are summarized in Table X.

TABLE X

Fluidity Test, % Copolymer Required to Pass at −6° F.

| Copolymer of Example | Amount Copolymer for −6° F. Pass |
|---|---|
| XIII | 0.04 |
| XIV | 0.03 |
| XV | 0.025 |
| XVI | 0.03 |
| XVII | 0.02 |
| XVIII | 0.02 |

The copolymers of Examples XIII to XVI were also tested for pour point depression using 0.01 wt. % copolymer in Fuel Oil O which was a straight run No. 2 heating oil and Fuel Oil P which was also a No. 2 heating oil but a 50/50 blend of virgin and cracked gas oil. The results obtained are summarized in Table XI which follows:

TABLE XI

ASTM D-97 POUR POINT, ° F. USING 0.01 WT. % COPOLYMER

| Fuel Oil | Fuel Oil Per Se | XIII | XIV | XV | XVI |
|---|---|---|---|---|---|
| O | −5° F. | −30 | −35 | −50 | −35 |
| P | +20 | −20 | −15 | −30 | −20 |

As seen by the preceding Tables IX, X and XI, all of the copolymers were effective in improving flow and pour point. Thus, this data shows that copolymers prepared in non-aromatic solvents are as effective, or even more effective than those prepared in benzene, which had been commonly used for prior art ethylene-vinyl acetate free radical polymerization.

What is claimed is:

1. A distillate petroleum fuel oil boiling in the range of 250° F. to 750° F. containing about 0.001 to 2 wt. % of a wax crystal modifier which has a number average molecular weight of about 1,000 to 50,000 and is a copolymer consisting of 3 to 40 molar proportions of ethylene and one molar proportion of ester of the general formula:

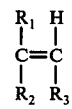

wherein:
(a) $R_1$ is selected from the group consisting of hydrogen and methyl radicals;
(b) $R_2$ is selected from the group consisting of —OOCR$_4$ and —COOR$_4$ groups;
(c) $R_3$ is hydrogen, and
(d) $R_4$ is a $C_1$ to $C_4$ alkyl group; which copolymer has less than 6 methyl terminating side branches per 100 methylene groups other than methyl groups on said ester, said copolymer being prepared by copolymerizing said monomers in an inert solvent by free radical catalysis at a temperature of about 70° to 130° C. using a catalyst having a half life at 130° C. under 1 hour and under pressure of 500 to 10,000 psi.

2. A distillate oil according to claim 1, wherein said temperature is in the range of 80° to 125° C. and said pressure is about 700 to 3000 psig.

3. A distillate oil according to claim 1, wherein said ester is vinyl acetate.

4. A distillate oil according to claim 3, wherein said molecular weight is about 1,000 to 2,900.

5. A distillate oil according to claim 1 wherein said copolymer is a random copolymer having a number average molecular weight of 1,000 to 2,900 of 3 to 20 molar proportions of ethylene per one molar proportion of vinyl acetate, characterized by about two methyl terminating side branches per 100 methylene groups as measured by nuclear magnetic resonance other than the methyl groups on the vinyl acetate.

6. A distillate oil according to claim 5, wherein said copolymer has been formed by copolymerizing said ethylene and vinyl acetate in solvent at a temperature in the range of about 70° to 130° C. using dilauroyl peroxide catalyst.

7. A distillate petroleum fuel oil boiling in the range of 250° F. to 750° F. containing about 0.001 to 2 wt. % of a wax crystal modifier which has a number average molecular weight of about 1,000 to 50,000 and is a copolymer consisting of 3 to 40 molar proportions of ethylene and one molar proportion of ester of the general formula:

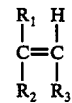

wherein:
(a) $R_1$ is selected from the group consisting of hydrogen and methyl radicals;
(b) $R_2$ is selected from the group consisting of —OOCR$_4$ and —COOR$_4$ groups;
(c) $R_3$ is hydrogen, and
(d) $R_4$ is a $C_1$ to $C_4$ alkyl group;
which copolymer is characterized by about two methyl terminating side branches per 100 methylene groups other than methyl groups on said ester.

8. A distillate petroleum fuel oil according to claim 7, wherein said molecular weight is about 1,000 to 2,900.

* * * * *